Figure 1:
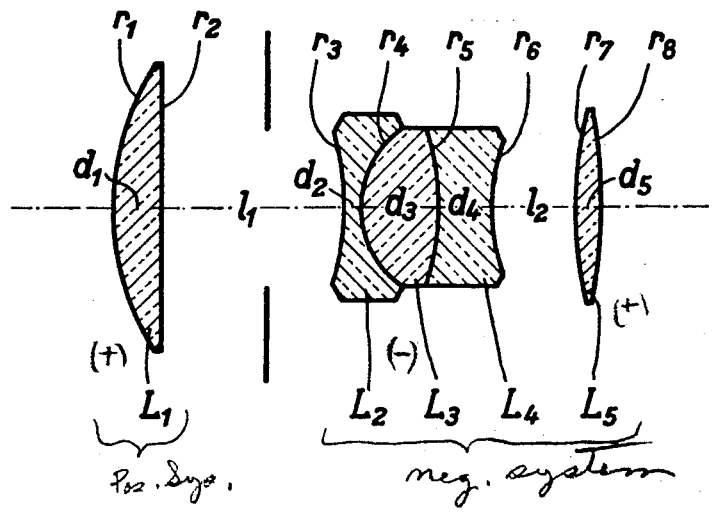

| | | $n_d$ | $v$ |
|---|---|---|---|
| $r_1 = +26.057$ | $d_1 = 4.55$ | $L_1 = 1.55226$ | 63.3 |
| $r_2 = \infty$ | $l_1 = 17.61$ | | |
| $r_3 = -25.924$ | $d_2 = 1.80$ | $L_2 = 1.56735$ | 42.8 |
| $r_4 = +9.077$ | $d_3 = 7.37$ | $L_3 = 1.58910$ | 61.3 |
| $r_5 = -24.582$ | $d_4 = 5.21$ | $L_4 = 1.59667$ | 39.1 |
| $r_6 = +18.515$ | $l_2 = 7.98$ | | |
| $r_7 = +39.119$ | $d_5 = 2.46$ | $L_5 = 1.67165$ | 32.3 |
| $r_8 = -53.602$ | | | |

Inventor:
Willy Merté

Aug. 29, 1939.   W. MERTÉ   2,171,274
TELEPHOTOGRAPHIC OBJECTIVE
Filed June 12, 1937   2 Sheets-Sheet 2

| | | | $n_C$ | $v$ |
|---|---|---|---|---|
| $r_1 = + 25.02$ | $d_1 = 5.23$ | $L_1 = 1.56696$ | | 63.1 |
| $r_2 = - 31.35$ | $d_2 = 1.18$ | $L_2 = 1.62064$ | | 35.7 |
| $r_3 = - 321.15$ | $l_1 = 0$ | | | |
| $r_4 = + 22.85$ | $d_3 = 1.31$ | $L_3 = 1.61769$ | | 60.4 |
| $r_5 = + 32.88$ | $l_2 = 7.83$ | | | |
| $r_6 = - 296.50$ | $d_4 = 2.16$ | $L_4 = 1.66596$ | | 41.8 |
| $r_7 = + 16.58$ | $b_1 = 2.32$ | | | |
| | $b_2 = 15.97$ | | | |
| $r_8 = + 40.60$ | $d_5 = 3.26$ | $L_5 = 1.46490$ | | 65.2 |
| $r_9 = - 32.50$ | $d_6 = 0.66$ | $L_6 = 1.66798$ | | 47.0 |
| $r_{10} = - 222.70$ | | | | |

Inventor:

Willy Merté

Patented Aug. 29, 1939

2,171,274

UNITED STATES PATENT OFFICE 2,171,274

TELEPHOTOGRAPHIC OBJECTIVE

Willy Merté, Jena, Germany, assignor to the firm Carl Zeiss, Jena, Germany

Application June 12, 1937, Serial No. 147,832
In Germany June 22, 1936

3 Claims. (Cl. 88—57)

The present invention concerns telephotographic objectives or, in other words, objectives the two principal points of which lie in front of the front lens, this front lens being the lens which faces the object in the case of reduction and the image in the case of magnification. In objectives of this kind, the principal points are given their special positions by disposing a negative lens system at a not inconsiderable distance in the rear of a positive lens system. Particular reference is had by the invention to objectives in which the negative lens system consists of two parts separated by air.

When the image field is more or less wide, all teleobjectives known so far and, consequently, also the objectives of the latter kind, produce a cushion-shaped distortion which increases according to the increase of the image angle. The invention aims at correcting this distortion in the said latter kind of objectives and attains the condition that this distortion does not increase continuously, as is the case generally, but is reduced at a definite image angle within the useful image field when the distance of the two parts of the negative system from each other is comparatively great, viz. at least equal to one third of the distance apart of the negative and the positive system of the objective, and when the inner part of the negative system is very dispersive and the outer part of this system has a convergent refractive surface facing the inner part.

The outer of the two parts of the negative system may, itself, be dispersive, but it may also be convergent. In any case, it is convenient to use an outer part having a refractive power of a numerical value smaller than that of the refractive power of the inner part. This inner part has conveniently a refractive power the numerical value of which is greater than that of the refractive power of the positive system of the objective.

To obtain good correction, it is further advantageous to provide that the distance of the two parts of the negative system from each other is greater than the distance apart of the negative and the positive system of the objective.

According to requirements, each of the single parts of the objective, i. e. the positive as well as the negative system, may be composed of a plurality of lenses.

The accompanying drawings and the following tables illustrate and have reference to two examples of objectives according to the invention. The statements in the tables refer to focal lengths of the objectives of 100 millimetres.

Figure 2:
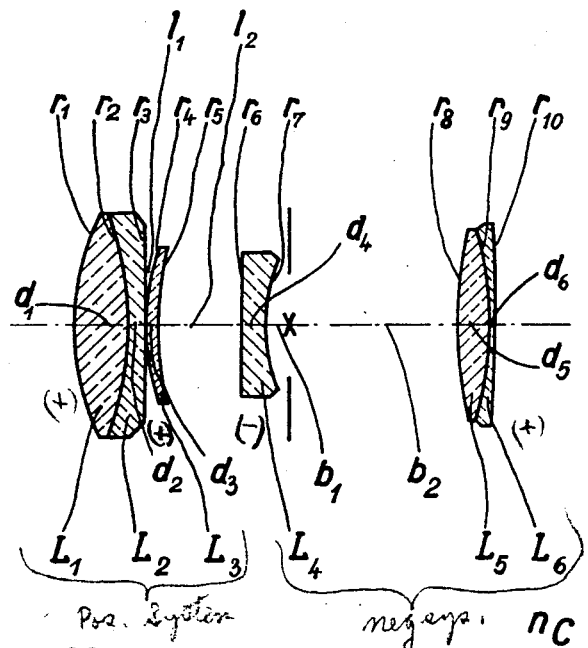

Figure 1 is a sectional view of one form of lens made according to this invention and Figure 2 is a similar view of a modification of the invention.

The objective according to Figure 1 is composed of a positive system, which is a single lens $L_1$, and a negative system consisting of a part of three lenses $L_2$, $L_3$, $L_4$ and a part constituted by a single lens $L_5$. The constructional example produces an exceedingly sharp image field of approximately 15° at a ratio of aperture of 1:4, the distortion being corrected. The chromatic correction is obtained substantially as regards the wave-lengths corresponding to the lines D and G'. The intersectional distance is equal to approximately half the focal length of the objective, and, in spite of the great ratio of aperture, the total length, i. e. the distance apart of the vertex of the front lens and the rear focal plane, is smaller than the local length of the objective.

| Radii | Thicknesses and distances | Kinds of glass | |
|---|---|---|---|
| | | $n_d$ | $\nu$ |
| $r_1=+26.057$ | $d_1=4.55$ | $L_1=1.55226$ | 63.3 |
| $r_2=\infty$ | $l_1=17.61$ | | |
| $r_3=-25.924$ | $d_2=1.80$ | $L_2=1.56735$ | 42.8 |
| $r_4=+9.077$ | $d_3=7.37$ | $L_3=1.58910$ | 61.3 |
| $r_5=-24.582$ | $d_4=5.21$ | $L_4=1.59667$ | 39.1 |
| $r_6=+18.515$ | $l_2=7.98$ | | |
| $r_7=+39.119$ | $d_5=2.46$ | $L_5=1.67165$ | 32.3 |
| $r_8=-53.602$ | | | |

The objective according to Figure 2 is composed of a postive system, consisting of two cemented lenses $L_1$, $L_2$ and a single lens $L_3$, and a negative system consisting of an inner part, which is a highly dispersive lens $L_4$, and an outer part, which comprises two cemented lenses $L_5$ and $L_6$. The indicated refractive indices are for the line C of the solar spectrum. The constructional example produces an image field of exceedingly sharp definition of approximately 30° at a ratio of aperture of 1:6.3, the distortion being corrected. The chromatic correction is obtained substantially for the wave-lengths corresponding to the lines A' and C. In the constructional example, the intersectional distance is amply 4/10 of the focal length of the entire objective, and the entire length, viz. the distance of the vertex of the front lens from the rear focal plane, amounts to slightly more than 8/10 of the said focal length.

| Radii | Thicknesses and distances | Kinds of glass | |
|---|---|---|---|
| | | $n_C$ | $\nu$ |
| $r_1 = + 25.02$ | $d_1 = 5.23$ | $L_1 = 1.56696$ | 63.1 |
| $r_2 = - 31.35$ | $d_2 = 1.18$ | $L_2 = 1.62064$ | 35.7 |
| $r_3 = -321.15$ | $l_1 = 0$ | | |
| $r_4 = + 22.85$ | $d_3 = 1.31$ | $L_3 = 1.61769$ | 60.4 |
| $r_5 = + 32.88$ | $l_2 = 7.83$ | | |
| $r_6 = -296.50$ | $d_4 = 2.16$ | $L_4 = 1.66596$ | 41.8 |
| $r_7 = + 16.58$ | $b_1 = 2.32$ | | |
| | $b_2 = 15.97$ | | |
| $r_8 = + 40.60$ | $d_5 = 3.26$ | $L_5 = 1.46490$ | 65.2 |
| $r_9 = - 32.50$ | $d_6 = 0.66$ | $L_6 = 1.66798$ | 47.0 |
| $r_{10} = -222.70$ | | | |

I claim:

1. In a photographic objective the two principal points of which are in front of the front surface, the combination of a positive and a negative lens system, said negative system being in axial alignment with and lying in the rear of said positive system, said two systems being spaced apart by air, the refractive power of said positive lens system being greater than one and a half times and smaller than five times that of the objective, said negative system consisting of an outer and an inner part axially spaced by air, said inner part being dispersive, the numerical value of the refractive power of said outer part being smaller than the refractive power of the inner part, that refractive surface of said outer part which faces said inner part being convergent, and the axial air space between said inner and said outer part being greater than one third of the axial air space between said negative and said positive system.

2. In a photographic objective according to claim 1, the numerical value of the refractive power of the outer part of said negative system being smaller than that of said positive system, and the axial air space between the inner and the outer part of said negative system being greater than the axial air space between said negative and said positive system.

3. In a photographic objective according to claim 1, the numerical value of the refractive power of the inner part of said negative system being greater than the refractive power of said positive system.

WILLY MERTÉ.